United States Patent
Massie

[11] 3,859,547
[45] Jan. 7, 1975

[54] MULTI-POSITION SOLENOID WITH LATCHING OR NONLATCHING CAPABILITY

[76] Inventor: Philip E. Massie, 4220 Irving Pl., Culver City, Calif.

[22] Filed: Aug. 20, 1973

[21] Appl. No.: 390,037

Related U.S. Application Data

[63] Continuation-in-part of Ser. No. 211,245, Dec. 23, 1971, abandoned.

[52] U.S. Cl............ 310/14, 310/24, 310/30, 335/229, 335/234
[51] Int. Cl............................................. H02k 41/02
[58] Field of Search............ 335/229, 251, 234; 310/12-19, 30, 23, 24; 318/135; 317/123

[56] References Cited
UNITED STATES PATENTS

| | | | |
|---|---|---|---|
| 3,070,730 | 12/1962 | Gray et al. | 335/229 |
| 3,119,940 | 1/1964 | Pettit | 310/24 |
| 3,130,331 | 4/1964 | Jallen et al. | 310/14 |
| 3,135,880 | 6/1964 | Olson et al. | 310/14 |
| 3,202,886 | 8/1965 | Kramer | 310/14 X |
| 3,453,510 | 7/1969 | Kreuten et al. | 310/14 X |

FOREIGN PATENTS OR APPLICATIONS

| | | | |
|---|---|---|---|
| 1,135,765 | 12/1968 | Great Britain | 310/14 |

*Primary Examiner*—Donovan F. Duggan
*Attorney, Agent, or Firm*—Herzig & Walsh

[57] ABSTRACT

A multi-position latching or nonlatching solenoid comprises a magnetic core with opposed salient stator poles having windings. A ferro-magnetic armature is mounted to reciprocate between the salient poles. A permanent magnet is associated with the core and armature. The two salient poles provide two latching positions. Improvement is provided by way of one or more additional pairs of salient stator poles with associated windings. Each additional pair of stator poles provides one additional latched position. Five or more latched positions can be provided. Simple variations in the construction make it possible to provide either plural latched or unlatched positions or a combination of plural latched and unlatched positions.

16 Claims, 13 Drawing Figures

INVENTOR.
PHILIP E. MASSIE

BY Albert M. Herzig
Edward C. Walsh
ATTORNEYS

MULTI-POSITION SOLENOID WITH LATCHING OR NONLATCHING CAPABILITY

This application is a continuation-in-part of application Ser. No. 211,234 filed on Dec. 23, 1971 now abandoned.

SUMMARY OF THE INVENTION

The invention relates to magnetic devices, more particularly, solenoid types of devices. The invention specifically is an improvement in a known type of electromagnetic or solenoid device.

BACKGROUND OF THE INVENTION

The herein invention is an improvement in a two position solenoid device of the type shown in prior U.S. Pat. Nos. 2,579,723 3,022,450, and 3,754,154. These prior patents are hereby incorporated herein by reference.

Other known prior art includes the following patents: U.S. Pat. Nos. 3,135,880; 3,183,410; 3,292,065; 3,430,120; 3,503,022; 3,566,224; 3,119,940; 3,453,510; 3,430,120; 3,202,886; and British Pat. No. 1,135,765.

The prior art referred to teaches a solenoid type of device embodying a core having salient stator poles, windings, a ferro-magnetic armature, and a permanent magnet so associated with each other that the device has two stable latched positions obtained by energization of one or the other of the windings.

The herein invention is an improvement, particularly in the prior art type of device in U.S. Pat. Nos. 2,579,723 and 3,022,450. The specific improvement resides in the provision for or realization of the capability of having three or more stable positions which may be either latched or unlatched positions, as desired. The primary object of the invention is to make possible and realize a magnetic or solenoid device of this type having more than two, that is, plural stable positions which may be either latched or unlatched or there may be a combination of latched and unlatched positions. Such a device has many areas of utilization by reason of its capability of providing plural or multiple stable positions latched or unlatched, rather than only two. The device accommodates itself to control from very simple circuitry involving switches for control of individual windings. The device is clearly distinguishable from linear stepping devices which typically cannot be moved from one position directly to any one of the other multiple positions.

A further object of the invention is to provide for the multiple position capabilities referred to in a simple and an efficient way involving the addition of further pairs of salient poles and associated windings to the basic magnetic core of the device. In the improved device, the ferro-magnetic armature is provided with one or more pairs of salient poles which cooperate with the additional salient poles of the magnetic core. Typically, in the improved device of the invention, there are two positions which are end positions of the movable structure. Additional positions are provided by pairs of salient poles on the armature and cooperating pairs of salient stator poles. Each additional position is provided by alignment of sets of poles on the armature with corresponding sets of salient stator poles, the number of positions depending upon the number of additional sets of poles provided.

A further object is to make possible nonlatching configurations of the solenoid, and solenoids having multiple positions with combinations of latching and nonlatching positions by way of the use of nonmagnetic plugs in the air gaps of the device so related as to produce the latching and/or nonlatching characteristics.

A further object is to realize in solenoid configurations of the type referred to in the foregoing, the capability in a multiposition device of the movable armature being movable directly from any one position to any one of the other positions. A corollary object is to realize the capability of latching in each position without the application of power.

A further object is to realize a multi-position solenoid having characteristics as set forth in the foregoing, further embodying the characteristic that the pole configurations of the stator and armature are such that individual pairs of stator and armature poles are juxtaposed in individual discrete solenoid positions, and that in these positions, the flux is concentrated in the juxtaposed poles.

A further object is to provide stator poles and windings including additional pairs of shielding windings which shield flux from parallel gaps other than that of the individual desired position whereby each individual position is discrete, firm, and unambiguous.

BRIEF DESCRIPTION OF THE DRAWINGS

Further objects and additional advantages of the invention will become apparent from the following detailed description and annexed drawings, wherein.

DESCRIPTION OF THE PREFERRED EMBODIMENT

As previously pointed out, two-position latching solenoids are shown in prior U.S. Pat. Nos. 2,579,723 and 3,022,450. U.S. Pat. No. 3,754,145 shows a two-position magnetic latching device with a permanent magnet as the biasing element. This patent describes the detailed changes in flux patterns or flow that cause the moving armature to move from one extreme of travel to the other. U.S. Pat. No. 3,754,154 is hereby incorporated herein by reference.

Figure 1:
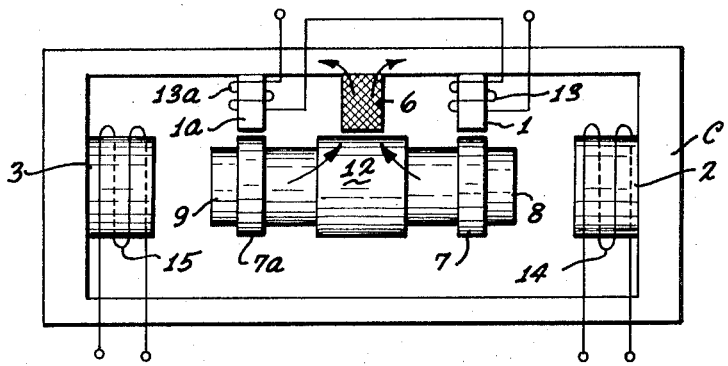
FIG. 1 is a diagramatic view of one form of the invention.

FIG. 1 shows a device which is an improvement over the prior art devices as referred to, the device shown being a three-position latching solenoid. Letter C designates a rectangular magnetic yoke or core. It has inwardly extending salient pole pieces positioned at 2 and 3. These poles are salient poles which are aligned with ferro-magnetic armature 12 that has a center part adjacent to permanent magnet 6 which is between one leg of the magnetic core and the armature. The armature is able to reciprocate axially along its length. Numerals 1 and 1a are structural parts of the magnetic core C which provide salient magnetic stator poles. Each has a winding on it designated at 13 and 13a which can be energized by electrical connections as shown. Poles 2 and 3 have windings 14 and 15 and can be separately energized.

Adjacent to ends 8 and 9 of ferro-magnetic armature 12 are enlargements 7 and 7a which provide salient armature pole pieces which can align with stator poles 1 and 1a.

If the permeance of air gaps 7-1 and 7a-1a (between pole pieces 7 and 1 and between pole pieces 7a and 1a) is greater than the permeance of air gaps 8-2 and 9-3, the largest amount of flux will flow in gaps 7-1 and 7a-1a which develops the largest force and retains the armature in the position shown in FIG. 1. This is a third position and it is a latched position. This third position represents the improvement beyond the prior art discussed above. As may be observed, without the windings and poles which produce the third position as described, the device of FIG. 1 operates like the devices of the prior art patents referred to.

Armature 12 may be moved to close air gap 8-2 by energizing coil 14. Air gaps 7-1 and 7a-1a will now be larger and have a less permeance. The armature will remain latched, and gap 8-2 will be closed. If power is applied to windings 13 and 13a, this will produce a magnetomotive force in a direction to aid the flux from pole 1 to 7 and 1a to 7a. Further, this magnetomotive force as applied to air gap 8-2 will be such as to oppose the existing flux flow in gap 8-2, thus reducing the flux and the force. Thus, flux is diverted to gaps 7-1 and 7a-1a; and the armature moves to align poles 7 and 1 and 7a and 1a, as shown in FIG. 1.

Figure 2:
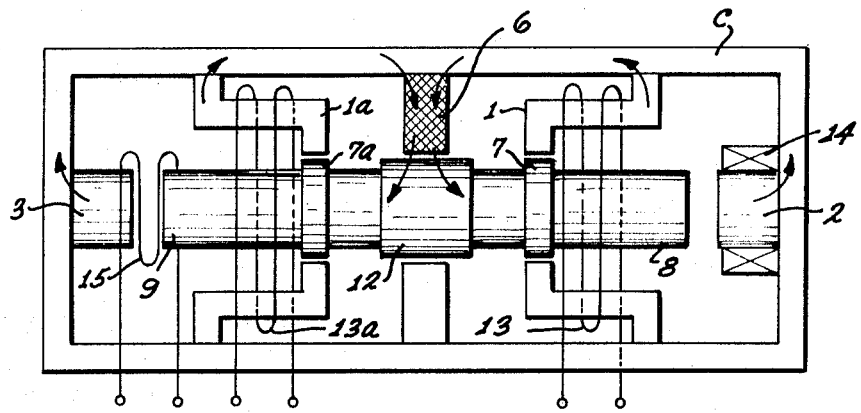
FIG. 2 is a diagramatic view of a modified form of the invention of FIG. 1.

In FIG. 1, there is a discrete stator pole structure 1 and 1a with coils wound around these poles. FIG. 2 shows an improved type of construction which facilitates manufacture. Stator poles 1 and 1a are made cylindrical as shown with end flanges. The flange on one end joins yoke C, and the flange on the other end extends to a position adjacent pole pieces 7 and 7a. Coils 13 and 13a are wound around these cylindrical structures. As can be seen, these coils will produce magnetomotive force to cause flux to flow from poles 1 and 1a to 7 and 7a, respectively, in both sides of the magnetic circuit. There is one coil for each total air gap 1-7 and 1a-7a. These coils can readily be "bobbin" wound and assembled coaxially on the magnetic structures. Poles 7 and 7a are preferably in the form of disc flanges.

The structure of FIG. 2 is otherwise like that of FIG. 1 and operates similarly.

Figure 3A:
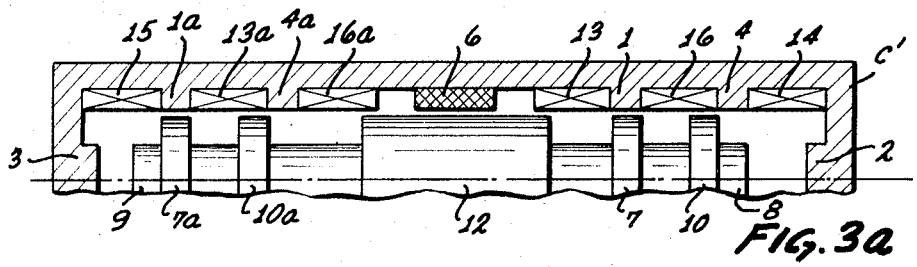
FIGS. 3a, 3b, and 3c are diagramatic views showing three positions of a modified form of the invention which is a four-position latching solenoid.
Figure 3B:
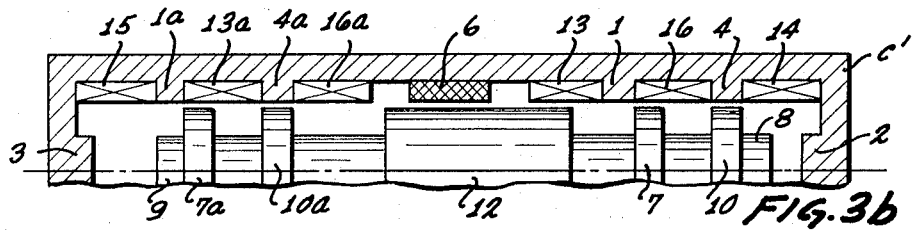
Figure 3C:
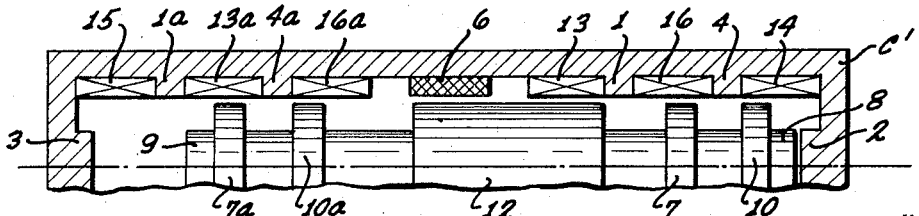
Figure 4A:
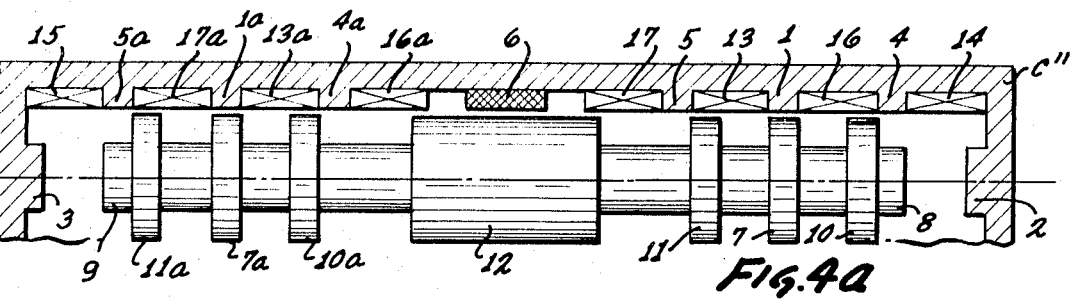
FIGS. 4a, 4b, 4c, 4d, and 4e are diagrammatic views showing five positions of a modified form of the invention which is a five-position latching solenoid.
Figure 4B:
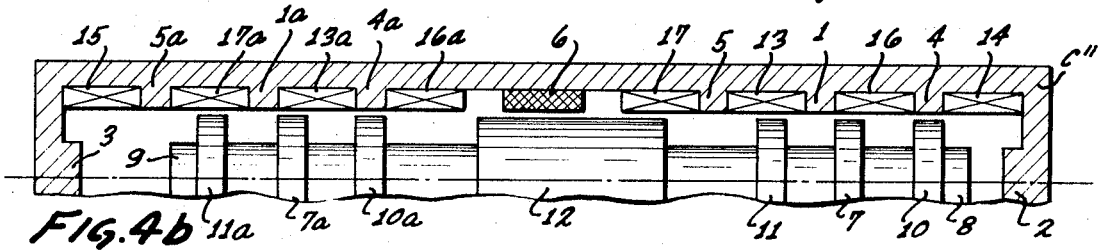
Figure 4C:
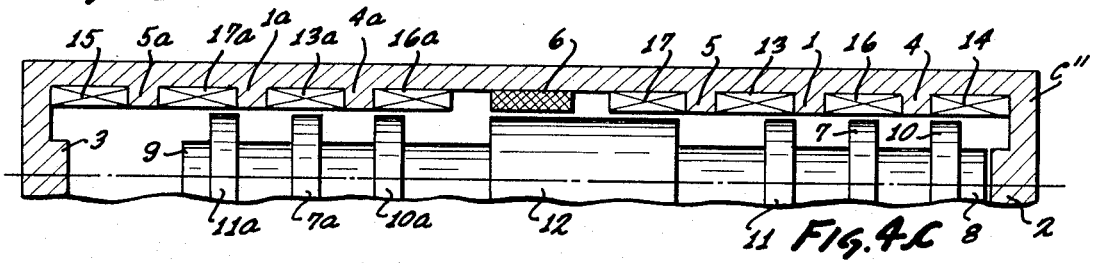
Figure 4D:
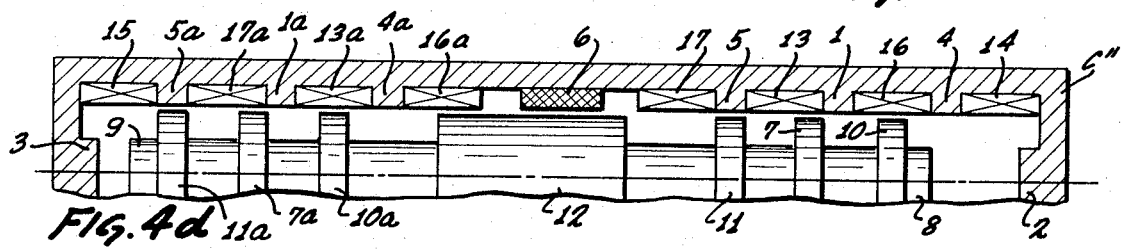
Figure 4E:
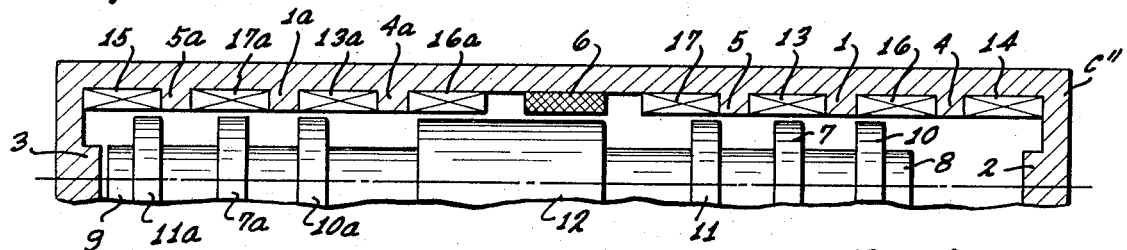

FIGS. 3a, 3b, and 3c illustrate a carrying forward of the principle in a modified form of the invention which is a four-position latching solenoid, three of the four positions being shown in these figures. The magnetic yoke or core is designated at c'. The corresponding parts are designated by similar reference characters. Yoke member C' has internal recesses as shown to accommodate windings 13, 16, and 14 and 13a, 16a, and 15 which are cylindrical windings fitting in the recesses as shown. The central recess is of larger extent and accommodates windings 13 and 16a and the permanent magnet 6. The windings are coaxial with respect to the armature. Core C' now has two additional pairs of salient stator poles formed by annular flanges between recesses identified at 4, 1, 4a, and 1a.

Armature 12 is longer and has additional salient poles which are disc flanges identified by 7, 10 7a, and 10a. Electrical connections are provided to the windings to energize them in pairs. The device now has four positions including the two end positions, one of which is shown in FIG. 3c and two intermediate positions (rather than one as in FIGS. 1 and 2). FIGS. 3a and 3b show the two intermediate positions. In one intermediate position, poles 1-7 and 1a-7a align; and in the other intermediate position, poles 4-10 and 4a-10a align as shown.

The structure as shown in these three figures carries forward the principle of the previous embodiment to a four-position latching solenoid. If an electromotive force is applied by coil 13a such as to aid the flow of flux in air gap 7a-1a, this magnetomotive force will be such as to oppose the flux in air gap 10a-4a. As described in connection with the previous embodiment, this will result in flux being diverted from gap 9-3. Thus, it can be seen that the magnetomotive force produced by coils 13 and 13a will uniquely affect air gaps 7-1 and 7a-1a and cause the largest flux to flow in these gaps, thus moving the armature to align these gaps. Similarly, coils 16 and 16a will uniquely affect pole pieces associated with that coil set. FIGS. 3a, 3b, and 3c show three of the four positions of the four-position solenoid. In addition to the movements described, it is possible to have armature 12 in the extreme position of FIG. 3c with air gap 8-2 closed and to then apply power to coil 15 and to have the flux diverted from all other air gaps such as to move the armature in one movement to the position associated with closed air gap 9-3. This is the fourth position not shown.

FIGS. 4a through 4e show a modified form of the device carrying forward the same principle embodied in a five-position latching solenoid. Five positions are shown. Parts corresponding to parts in the previous embodiments are identified by similar reference characters for convenience of description. It will be observed that the structure corresponds to previously described structure. Additional pole pieces are provided on the armature and core and additional corresponding sets of windings. The core is identified as C''. Coils 17 and 17a, stator poles 5 and 5a, and armature poles 11 and 11a are added to the previous embodiment in corresponding symmetry. Configuration of the pole faces is shown schematically. The pole faces are readily adapted to shaping as required in order to minimize parasitic flux leakages such as for example in gaps 10-4, 10a-4a, 11-5, and 11a-5a in FIGS. 4a through 4e. In each case in these figures, coils 17, 13, 16, 14 and 17a, 13a, 16a, and 15 affect or control a specific air gap and cause the armature to assume the associated position when energized. As long as the aligned air gap has the highest permeance with power removed from the coil, the armature will latch in that position. The operation corresponds to that of the previous embodiment except for the additional positions.

The following table shows the five positions in terms of pole alignments and end positions.

| Position | FIG. No. | Alignments |
| --- | --- | --- |
| 1 | 4a | 7-1 and 7a-1a |
| 2 | 4b | 10-a and 10a-4a |
| 3 (right end) | 4c | Gap 8-2 closed |
| 4 | 4d | 11-5 and 11a-5a |
| 5 (left end) | 4e | Gap 9-3 closed |

Figure 5:
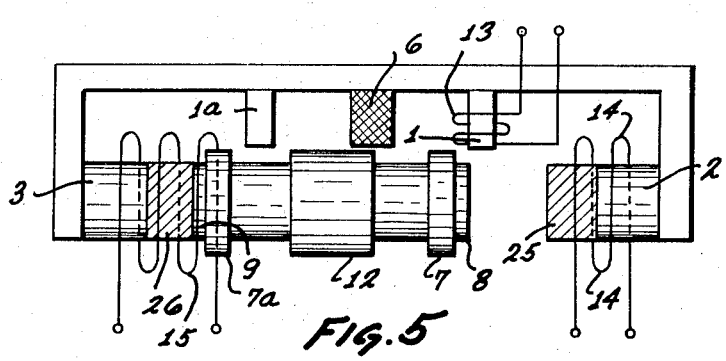
FIG. 5 is a diagramatic view of an alternative form of the invention which is a three-position nonlatching solenoid.

It is possible to construct a solenoid having multi-positions, that is, more than two, having a nonlatching characteristic. Reference is made to FIG. 5. This structure us like that of FIG. 1, except in certain respects as will be described. Corresponding parts are identified by similar reference characters to simplify description and avoid repetition. Referring to air gap 8-2, in this air gap adjacent to pole 2 is a piece of nonferro-magnetic material 25. Armature 12 has room to move from the 7-1 gap position to the 8-2 gap position. The length of air gap 8-2 is kept large by the nonmagnetic piece of material or plug 25. Gap 8-2 will have the higher flux as long as power is applied to coil 14, the design being as described hereinafter. With no power on any coil and with the armature moved to close air gap 8-2 to the limit permitted by nonmagnetic plug 25 and if in this position, air gaps 7-1 and 7a-1a still have the higher permeance, the greater flux will flow in these air gaps and generate the greater force returning the armature to the 7-1 aligned position. Thus, by inserting into air gaps 8-2 and 9-3 nonmagnetic plugs as shown at 25 and 26, the solenoid can be made to have three positions, but nonlatching. The armature will remain in the 8-2 or 9-3 positions only as long as power is continuously applied to the associated coil. By suitable proportioning of the various air gaps, the same mode of operation can be applied to more than three positions. As already seen, for a five-position solenoid shown in FIGS. 4a through 4e, it will have the characteristic that each gap will tend to overpower the next gap farther away from the center (or other key) gap and in turn will be overpowered by the next gap toward the center position. By astute design, the solenoid can be made to have any combination of latching and nonlatching characteristics and positions. For example, considering FIG. 1, if there is a nonmagnetic plug or piece in gap 8-2 and none in gap 9-3, gaps 9-3 and 7-1 will be latching while gap 8-2 will be nonlatching. This concept can be extended to more gaps by way of practical design that follows directly from the foregoing teaching.

Some further mention might be made of the affect of having gaps 7-1, 10-4, and 11-5 of cylindrical form in respect to the magnetic force developed in the gap. As explained in the prior application referred to above, the dominant factor in the magnetic circuit associated with the air gaps is the permeance of the air gap. This is a straight line function up to the point of iron saturation. The force $W$ is proportional to the flux density in kilomaxwells. The effective air gap area $A$ is in square inches; the gap length $L$ is in inches; and the force is in pounds. For a fixed magnetomotive force and a fixed length of air gap, where the gap length in inches is constant, the force $W$ equals $A/72L^2$. Since $L$ is constant, the force increases with air gap area up to the point if iron saturation for constant magnetomotive force. As the area increases, the magnetomotive force will drop slightly; but the low permeance of the air gap compared with the iron of the circuit will keep the magnetomotive force high. Therefore, it is to be seen that a cylindrical gap between the salient poles is advantageous.

The electrical drive for the coils can be provided by any convenient means such as parallel circuits with switch contacts in each. For a latching solenoid, the switches can be momentary on type applying power only as long as the switch is held closed. Switches can be mechanical contact or semi-conductor switches or switching amplifiers depending on the application or utilization.

From the foregoing, it will be understood that in the multi-position solenoid as described, the armature can be moved directly from any one position to any of its other positions. The magnetic field of the permanent magnet will cause it to be latched in each position without application of power. The following explains why the solenoid has this capability. This depends on the amount of flux that can be forced through a specific gap or gaps when excited by the magnetomotive force (MMF) of one or two coils. Flux flow is equal to the product of MMF times permeance, $\phi = FP$. Thus, an MMF impressed on two air gaps in parallel will produce flux in both gaps based on the permeance of the two magnetic circuits. Since the permeance of iron is a thousand (or more) times greater than air, the flux flow is largely controlled by permeance of the air gaps. Total permeance is of the form $1/P = 1/P_1 + 1/P_2$. Thus, a lower pemance air gap will control, although the permeance of the iron is very high.

Figure 6:
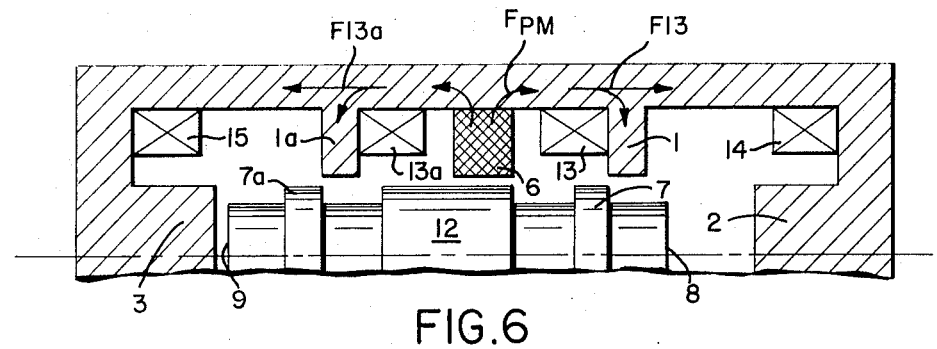
FIGS. 6 and 7 are diagramatic views of modified forms of the invention.

FIG. 6 of the drawings is a three-position solenoid which is a slight modification of FIG. 1, corresponding parts being identified by corresponding reference numerals. Windings or coils in FIG. 6 are of the same type as appear in FIGS. 3 and 4.

The foregoing explanation of the capability of movement from any position to any other position can be understood from the following in reference to FIG. 6. Considering the most significant case, that of the third or middle position, FIG. 6 shows the armature at the left position with the gap 3-9 nearly closed. Since permeance is of the form $P = uA/L$, where $u$ is inherent permeability of the material, a short air gap of large area will have a high permeance. With the armature as shown, coils 13 and 13a are electrically excited to move the armature to the middle position. Flux due to the permanent magnet is approximately constant. The variable is the flux due to the coil MMF. The MMF of coils 13 and 13a will be equal. Since gap 2-8 is long, most of the flux due to coil 13 will pass through gap 1-7. Although a division of flux flow is shown at F-13, there will be little flux through gap 2-8. Pole 1 has a shielding effect on the MMF of coil 13.

The MMF of coil 13a is a different problem. There is a shielding effect by pole 1a to the MMF of coil 13a. Since gap 3-9 is short, the permeance is high; and since gaps 1a-7a and 3-9 are in parallel, the design of gap 3-9 is important such that excessive flux not be diverted from gap 1a-7a to gap 3-9. This design is possible. The shielding effect of pole 1a and the combined MMF of both coils can be made to divert flux away from gap 3-9.

It should be noted that the flow of flux due to both coils is effectively limited by the flux available from the permanent magnet. A reference to the magnetization curve of a permanent magnet (known in the literature), will show that a large increase in reluctance (decrease in permeance occurs in a permanent magnet as increased flux is (attempted) to pass through the magnet. Thus, as both coils apply MMF to pass flux through the respective poles, both coils draw on the limited flux available from the permanent magnet.

With suitable design of gap 3-9, these two effects can be made to divert flux to gaps 1-7 and 1a-7a, that is a shielding effect of the poles on the respective coils and the combined MMF of both coils applied to draw flux away from gap 3-9.

Figure 7:
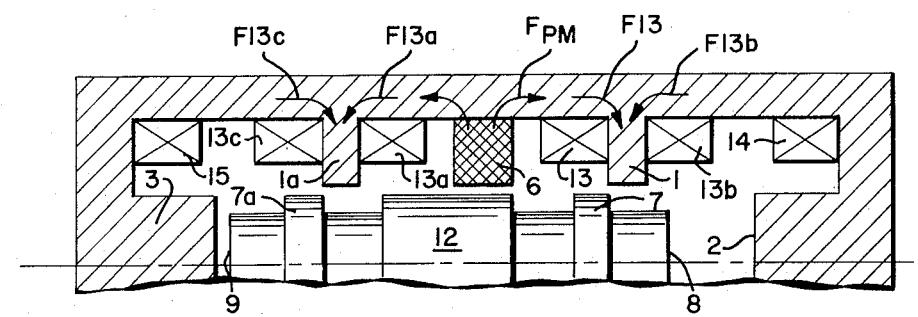

FIG. 7 shows a further modification of FIG. 6. Again, corresponding parts are identified by corresponding reference characters. Two coils are added, 13b on the opposite side of pole 1 and 13c on the opposite side of pole 1a (the poles are circular discs). Coils 13 and 13b are connected in series or parallel such as both have an MMF tending to force flux toward pole 1. Similarly, coils 13a and 13c are connected so both force flux into pole 1a. It is obvious that coil 13c has a MMF such as to actively drive flux away from gap 3–9. This configuration is preferred in devices with a number of positions greater than 4 or 5. Since poles 1 and 1a in FIG. 1 are radial fingers with the coil around them, the MMF is impressed exclusively on the poles. Thus each draws flux from all other poles to the desired pole. This is the more expensive means of fabrication. The double coil design has the same effect with the disc shaped poles. Fabrication, even with the added coils is much cheaper. Thus, as can be seen, a multi-position solenoid is realized having multiple discrete unambiguous position. In each position, pairs of poles are directly juxtaposed. The coil configuration is such that the flux concentrades in the juxtaposed poles at the particular desired position of the multiple positions.

From the foregoing, those skilled in the art will readily understand the nature of the construction of the invention, its operation, and the manner in which it achieves and realizes all of the objectives and advantages set forth in the foregoing.

The foregoing disclosure is representative of preferred forms of the invention and is to be interpreted in an illustrative rather than a limiting sense, the invention to be accorded the full scope of the claims appended hereto.

What is claimed is:

1. In a magnetic device in combination: means comprising a magnetic core member having salient stator poles having windings associated therewith; an armature positioned for reciprocating between said salient poles; and a permanent magnet carried by said core and associated with the armature whereby energization of alternate windings will cause the armature to reciprocate, the improvement comprising the armature having symmetrical salient poles, and said core having at least one additional salient stator pole and winding, said armature poles and additional salient stator pole being relatively positioned whereby to establish at least one additional intermediate position of said armature established by said additional salient stator pole, the relationship of said armature and core poles and said windings being such that said armature may be moved directly from any one position to any other position without stepping through intermediate positions.

2. A structure as in claim 1, wherein said poles and windings are related in a way whereby the armature latches in each position by means of a flux circuit including said permanent magnet.

3. A structure as in claim 1, wherein said additional salient stator poles is of cylindrical form having a winding thereon, the armature being configured to pass through said additional salient stator pole.

4. A structure as in claim 1, whrein said armature is provided with a plurality of symmetrical pairs of salient poles, said core having a corresponding plurality of additional pairs of salient stator poles having windings, said salient poles of the armature and said salient poles of the core being so positioned relatively as to establish additional, plural, predetermined positions of the armature.

5. A structure as in claim 4, wherein said poles and windings are so related as respects magnetomotive force generated that the armature latches in each of its relative positions.

6. A device as in claim 1, wherein the armature has a single pair of symmetrical, salient poles, and said core has a single, corresponding additional pair of salient stator poles having windings, said poles being so positioned in the device as to produce a single, additional, intermediate position which is midway between two end positions.

7. A device as in claim 1, wherein said core member has annular recesses having said windings positioned therein.

8. A device as in claim 1, wherein said salient armature poles are in the form of disc flanges on the armature.

9. In a magnetic device, in combination, a magnetic core member having salient stator poles having windings associated therewith; an armature positioned for reciprocation between said salient poles; a permanent magnet associated with the core and armature whereby energization of alternate windings will cause the armature to reciprocate, the improvement comprising the armature having an additional salient poles intermediate its ends, said core having an additional salient stator pole positioned relatively to said armature pole to cooperate therewith and having a winding, nonmagnetic elements positioned in the air gaps between said first salient stator poles and the armature whereby the armature has at least three positions which are nonlatching.

10. In a magnetic device, in combination: a magnetic core member having spaced opposed end poles and a winding on each end pole; an elongated armature having end pole faces and mounted for longitudinal reciprocation between said end poles; a permanent magnet carried by said core member to provide a magnetic flux in said core and armature; said core member having at least one pair of poles intermediate said end poles and windings associated therewith; and said armature having at least one pair of salient poles thereon intermediate the ends thereof which are opposed to said intermediate poles of said core in an intermediate position of said armature wherein the reluctance between said opposed poles is less than the reluctance between any other poles on said armature and core whereby energization of any selected windings moves said armature directly to only a corresponding position irrespective of its previous position.

11. A device as in claim 1, said salient stator poles and said armature salient poles being so positioned that in said intermediate position, the stator and armature poles are juxtaposed in such a way as to concentrate flux in the juxtaposed poles in a manner to realize discrete individual unambiquous position.

12. A device as in claim 1, wherein the core has at least one salient stator pole in the form of a radially extending member having a winding around it.

13. A device as in claim 11, wherein the core has an additional pair of salient poles which are of annular configuration.

14. A device as in claim 11, including an additional pair of windings associated with said additional pair of core salient poles intermediate the end poles positioned to concentrate flux in the associated poles and to shield flux from parallel air gaps.

15. A device as in claim 10 wherein the permanent magnet has relationship to the armature poles and core poles to provide latching flux in each armature position.

16. A device as in claim 15 wherein the core has plural intermediate pairs of poles and the armature has plural intermediate pairs of poles cooperable with core poles to establish plural armature positions.

* * * * *